United States Patent
Takai et al.

(10) Patent No.: US 7,958,279 B2
(45) Date of Patent: Jun. 7, 2011

(54) ASYNCHRONOUS SERIAL DATA APPARATUS FOR TRANSFERRING DATA BETWEEN ONE TRANSMITTER AND A PLURALITY OF SHIFT REGISTERS, AVOIDING SKEW DURING TRANSMISSION

(75) Inventors: Tomohisa Takai, Kawasaki (JP); Ryo Fukuda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 179 days.

(21) Appl. No.: 12/405,953

(22) Filed: Mar. 17, 2009

(65) Prior Publication Data

US 2009/0183020 A1 Jul. 16, 2009

Related U.S. Application Data

(60) Division of application No. 11/368,495, filed on Mar. 7, 2006, now Pat. No. 7,519,742, which is a continuation of application No. PCT/JP2005/014376, filed on Jul. 29, 2005.

(30) Foreign Application Priority Data

Jul. 29, 2004 (JP) ................................. 2004/222118

(51) Int. Cl.
*G06F 13/00* (2006.01)
*G06F 13/12* (2006.01)

(52) U.S. Cl. .............. 710/32; 710/61; 710/71; 714/700; 714/707; 713/503

(58) Field of Classification Search ........................ None
See application file for complete search history.

(56) References Cited

U.S. PATENT DOCUMENTS

| | | | |
|---|---|---|---|
| 4,344,127 A | * | 8/1982 | McDaniel et al. ................. 700/1 |
| 4,542,501 A | | 9/1985 | Chevalet et al. |
| 4,590,467 A | * | 5/1986 | Lare ............................... 370/462 |
| 5,142,556 A | * | 8/1992 | Ito ................................. 375/354 |
| 5,386,585 A | | 1/1995 | Traylor |

(Continued)

FOREIGN PATENT DOCUMENTS

EP 0 443 589 8/1991

(Continued)

OTHER PUBLICATIONS

Michael R. Ouellette, Darren L. Anand, and Peter Jakobsen; Shared Fuse Macro for Multiple Embedded Memory Devices with Redundancy; CICC 2001; May 7, 2001.

*Primary Examiner* — Eron J Sorrell
*Assistant Examiner* — Dean Phan
(74) *Attorney, Agent, or Firm* — Oblon, Spivak, McClelland, Maier & Neustadt, L.L.P.

(57) ABSTRACT

A semiconductor integrated circuit apparatus, comprising a data transmitter circuit, and a plurality of data receiver circuits each having a data converter circuit which restores each of bits of identification number data and transfer data from a shift register of the data transmitter circuit to 2-bit complementary data transmitted via first and second transmission lines, a reception control circuit which, when a transfer completion signal has been received via a third transmission line, compares an allocated identification number with the restored identification number data, and a shift register provided in association with the reception control circuit, wherein each reception control circuit feeds transfer data transmitted from the data transmitter circuit corresponding to the identification number data to the associated shift register in accordance with a result of comparison between the identification number data and the allocated identification number.

8 Claims, 11 Drawing Sheets

U.S. PATENT DOCUMENTS 5,822,615 A * 10/1998 Yamashita et al. .............. 710/10
2004/0100400 A1 * 5/2004 Perelman et al. ............. 341/155

FOREIGN PATENT DOCUMENTS

| | | |
|---|---|---|
| EP | 0 996 262 | 4/2000 |
| JP | 2-52543 | 2/1990 |
| JP | 8-289961 | 11/1996 |
| JP | 8-328636 | 12/1996 |
| JP | 10-145436 | 5/1998 |

* cited by examiner

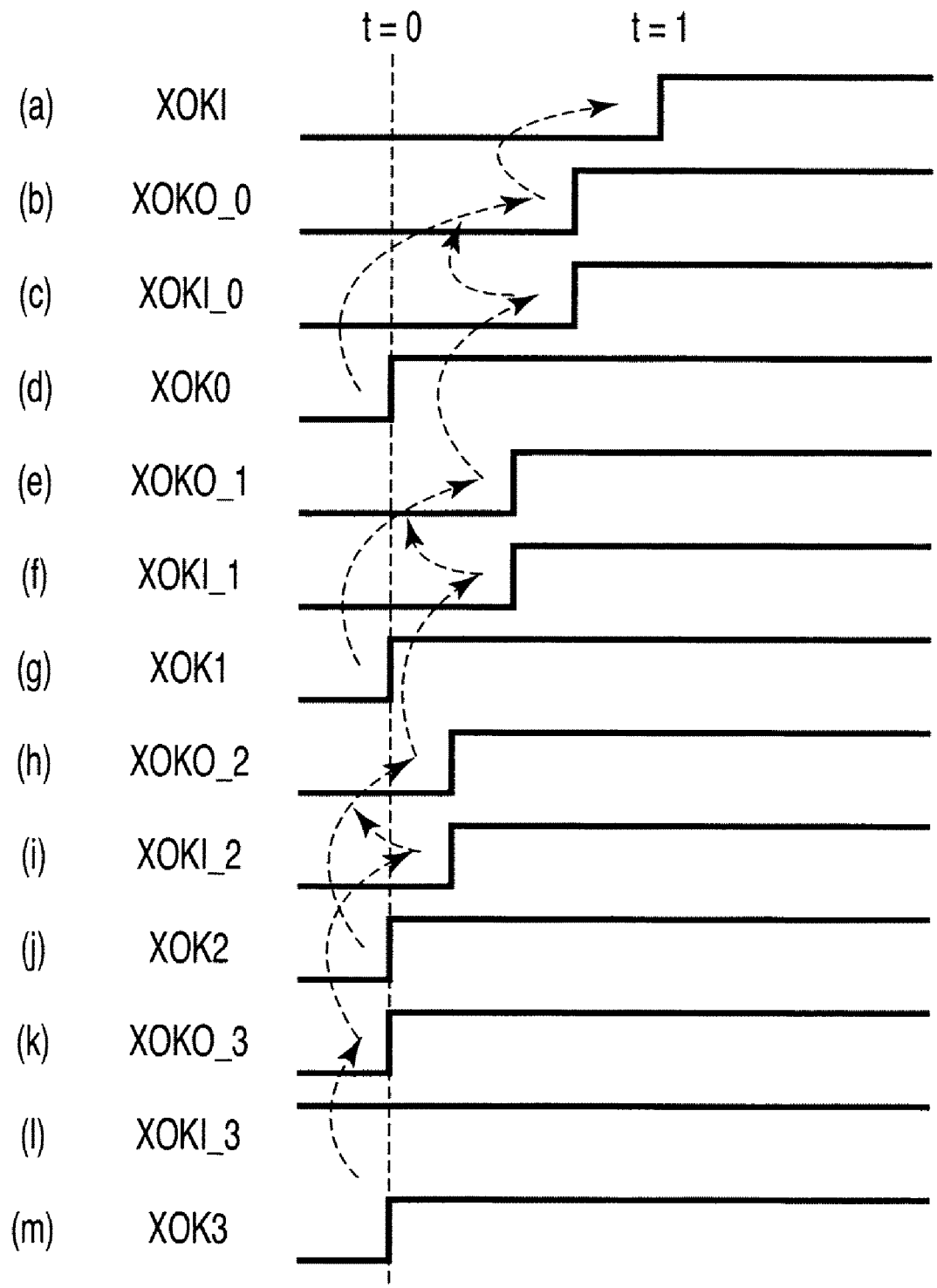
F I G. 7

US 7,958,279 B2

ASYNCHRONOUS SERIAL DATA APPARATUS FOR TRANSFERRING DATA BETWEEN ONE TRANSMITTER AND A PLURALITY OF SHIFT REGISTERS, AVOIDING SKEW DURING TRANSMISSION

CROSS-REFERENCE TO RELATED APPLICATIONS

This application is a division of and claims the benefit of priority under 35 U.S.C. §120 from U.S. Ser. No. 11/368,495 filed Mar. 7, 2006, which is a Continuation Application of PCT Application No. PCT/JP2005/014376, filed Jul. 29, 2005, which was published under PCT Article 21(2) in English, and claims the benefit of priority under 35 U.S.C. §119 from Japanese Patent Application No. 2004-222118 filed Jul. 29, 2004, the entire contents of each of which are incorporated herein by reference.

BACKGROUND OF THE INVENTION

1. Field of the Invention

The present invention relates to a semiconductor integrated circuit apparatus configured to transfer data to a plurality of shift registers.

2. Description of the Related Art

In a case where data is transferred between two shift registers each being composed of flip-flop circuits, in general, the data is transferred in synchronism with a common clock signal. However, in a case where there exists certain long data or clock transfer lines as compared with a period of the clock signal between two shift registers, there is a large problem with a transfer delay caused by a resistance and a capacity of these lines or a capacity between the adjacent lines, so that a circuit design becomes difficult.

In order to solve this problem, there is a method for transferring data from one shift register to another shift register in an asynchronous manner. This method includes the following steps.

First, data is sent from a shift register of a sending side to a shift register of a receiving side. When data receiving is completed in the receiving side shift register, a reception acknowledge signal is started and sent to the sending side shift register which terminates the data sending when the reception acknowledge signal is received. In the data receiving side, the sending of the reception acknowledge signal is terminated when the termination of the data sending is detected. When the termination of the reception acknowledge signal is detected in the data sending side, following data is sent to the receiving side shift register. This data sending operation is repeated for number of times corresponding to the number of bits between the data sending and receiving side shift registers.

When the reception acknowledge signal transmitted from the receiving side shift register to the sending side shift register is used in the receiving side as a clock signal to shift the data received from the sending side shift register and when the same acknowledge signal is used in the sending side as the clock signal to shift the data being sent to the receiving side shift register, it is possible to transfer the data reliably in an asynchronous mode irrespective of a length of a data transfer line from the sending side to the receiving side.

However, in a case where a plurality of receiving side shift registers exist on a semiconductor chip, for example, and these registers are connected to transmitting side shift registers via data transfer lines having different delay times from each other, even if the receiving side shift registers are connected in series, a transfer error caused by a dispersion of a transmission delay between the receiving shift registers is likely to occur, making it difficult to reliably transfer data.

BRIEF SUMMARY OF THE INVENTION

According to one aspect of the present invention, there is provided a semiconductor integrated circuit apparatus, comprising:

a data transmitter circuit including a shift register which stores identification number data and transfer data, and a transmission control circuit including a first data converter circuit which converts each of bits of the identification number data and transfer data from the shift register to 2-bit complementary data, and outputs the 2-bit complementary data to first and second output terminals, and a transfer managing circuit which outputs a data transfer completion signal to a third output terminal, following transfer of the identification number data;

first, second, and third transmission lines connected to the first, second, and third output terminals, respectively; and a plurality of data receiver circuits each of which has a second data converter circuit which restores 2-bit complementary data transferred from the data transmitter circuit via the first and second transmission lines to the identification number data and transfer data, a reception control circuit which has an allocated specific identification number, and which, when the data transfer completion signal has received via the third transmission line, compares the allocated identification number with the identification number data restored by the second data converter circuit, and a shift register provided in association with the reception control circuit, wherein each reception control circuit feeds transfer data transmitted from the data transmitter circuit to the associated shift register in accordance with a result of comparison between the identification number data and the allocated identification number.

BRIEF DESCRIPTION OF THE SEVERAL VIEWS OF THE DRAWING

FIG. 7 is an operating waveform chart of a transfer enable signal in the circuit of FIG. 1A;

DETAILED DESCRIPTION OF THE INVENTION

Hereinafter, some embodiments of the present invention will be described in detail with reference to the accompanying drawings.

First Embodiment

Figure 1A:
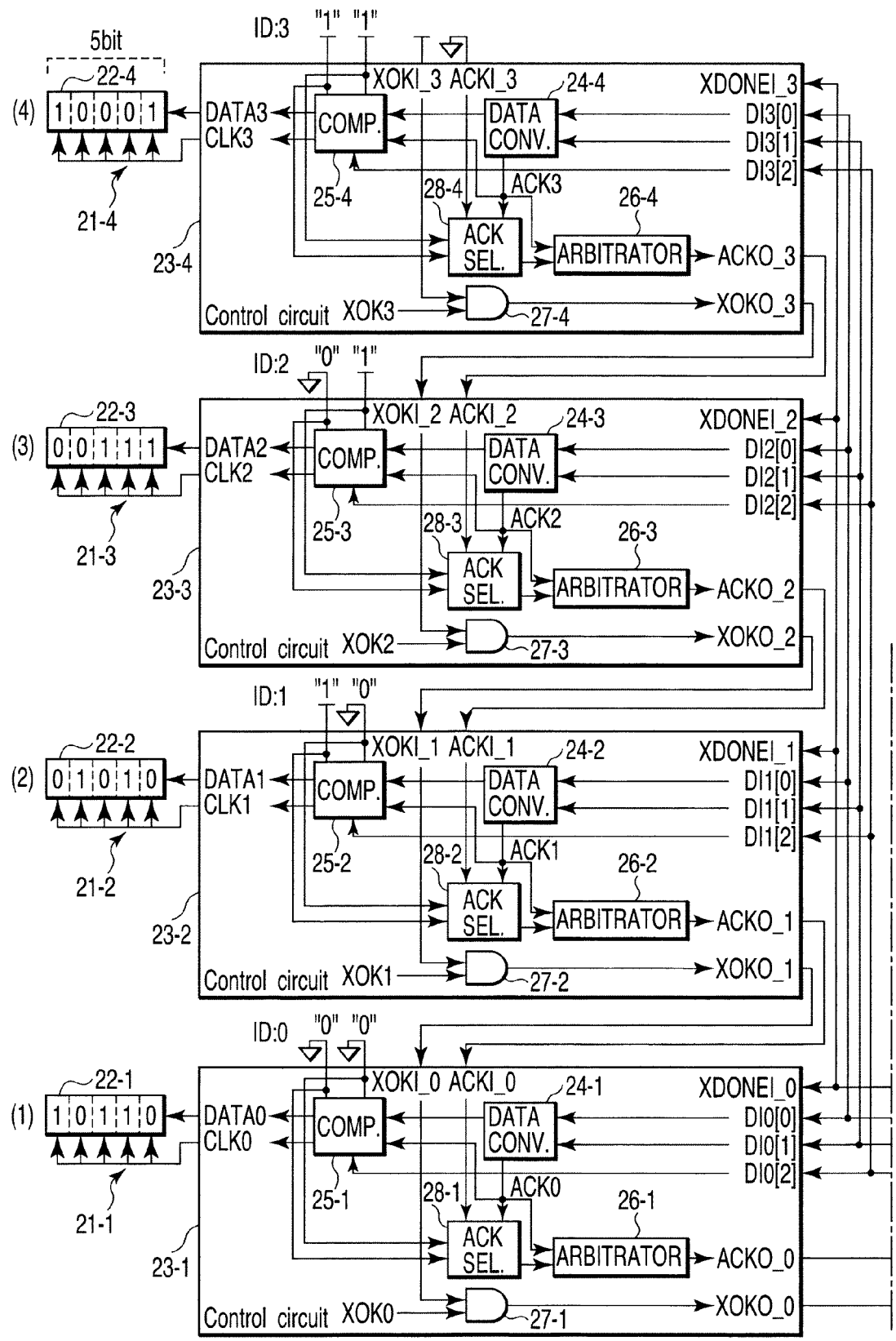
FIGS. 1A and 1B show, inclusively, a block diagram depicting a whole configuration according to a first embodiment of the present invention.
Figure 1B:
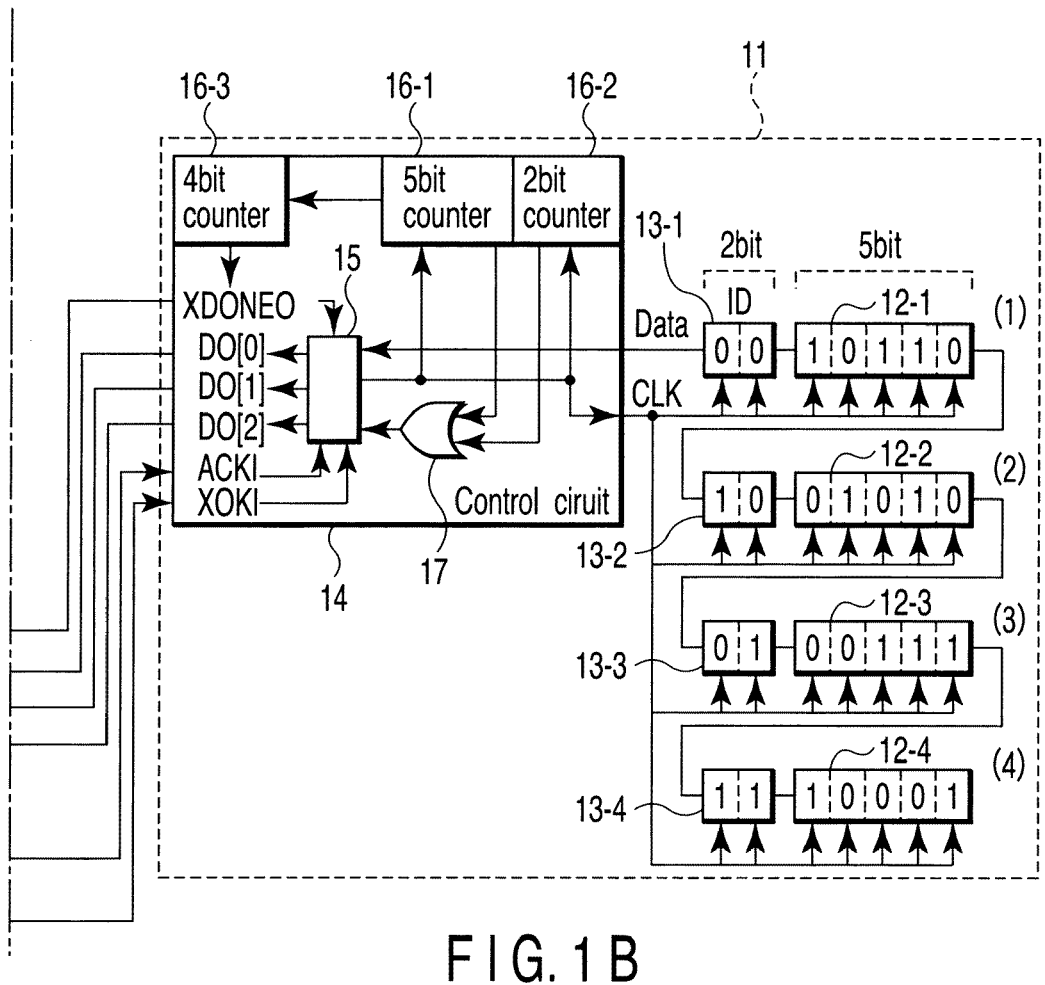

FIGS. 1A and 1B show block diagrams depicting a whole configuration according to a first embodiment of the present invention. As shown in FIG. 1A, a semiconductor integrated circuit apparatus according to the present embodiment comprises a plurality of (four) data receiver circuits 21-1, 21-2, 21-3 and 21-4.

The data transmitter circuit 11 has four shift registers 12-1, 12-2, 12-3 and 12-4 each connected in series in a 5-bit configuration. These shift registers 12-1 to 12-4 correspond to the number of shift registers provided in the data receiver circuits 21-4 to 21-4. Further, shift registers 13-1, 13-2, 13-3 and 13-4 with a 2-bit configuration are connected to an output side of each of the shift registers 12-1 to 12-4. A transmission control circuit 14 described later in detail is provided at an output side of the data transmitter circuit 11.

The shift registers 12-1 to 12-4 with a 5-bit configuration and the shift registers 13-1 to 13-4 with a 2-bit configuration are configured as shift registers with a 28-bit configuration. The shift registers are composed of flip-flop circuits each of which is associated with a fuse as a nonvolatile memory element, for example.

Figure 2:
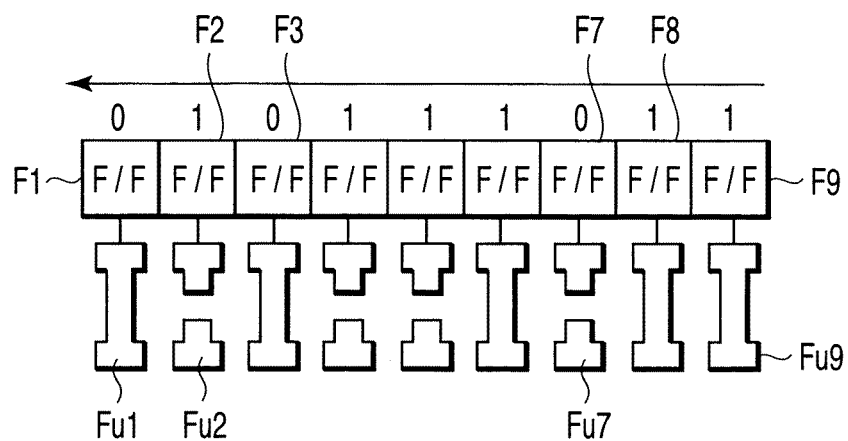
FIG. 2 is a view showing a method for setting data to a transmitting side shift register in FIG. 1B.

FIG. 2 shows an example thereof. FIG. 2 shows 9 flip-flop circuits F1 to F9 configuring a shift register for 9 bits of 28 bits. Fuses Fu1 to Fu9 serving as programmable nonvolatile memory elements are combined with these flip-flop circuits F1 to F9, respectively. For example, the fuse Fu1 shows a blown fuse and the fuse Fu2 shows a non-blown fuse. The bit data stored in the flip-flop circuit F1 having incorporated therein the non-blown fuse, for example, is "0". On the other hand, the bit data stored in the flip-flop circuit Fu2 having incorporated therein a blown fuse, for example, is "1". The data transfer direction caused by a clock signal in this shift register is set to a direction indicated by an arrow shown in FIG. 2, for example.

28 flip-flop circuits with a configuration shown in FIG. 2 are provided, whereby these flip-flop circuits can be used as the shift registers 12-1 to 12-4 and 13-1 to 13-4 of FIG. 1B. For example, the first two flip-flop circuits F1, F2 of FIG. 2 are used as a first shift register 13-1 with a 2-bit configuration. The next five flip-flop circuits F3 to F7 are used as a shift register 12-1 with a 5-bit configuration. The next two flip-flop circuits F8, F9 are used as a shift register 13-2 with a second 2-bit configuration. However, although the contents of data stored in the shift registers 13-1, 12-1, and 13-2 of FIG. 1B are different from those of FIG. 2, the contents "1" or "0" of the data can be freely set by the fuses Fu1 to Fu9.

Figure 3:
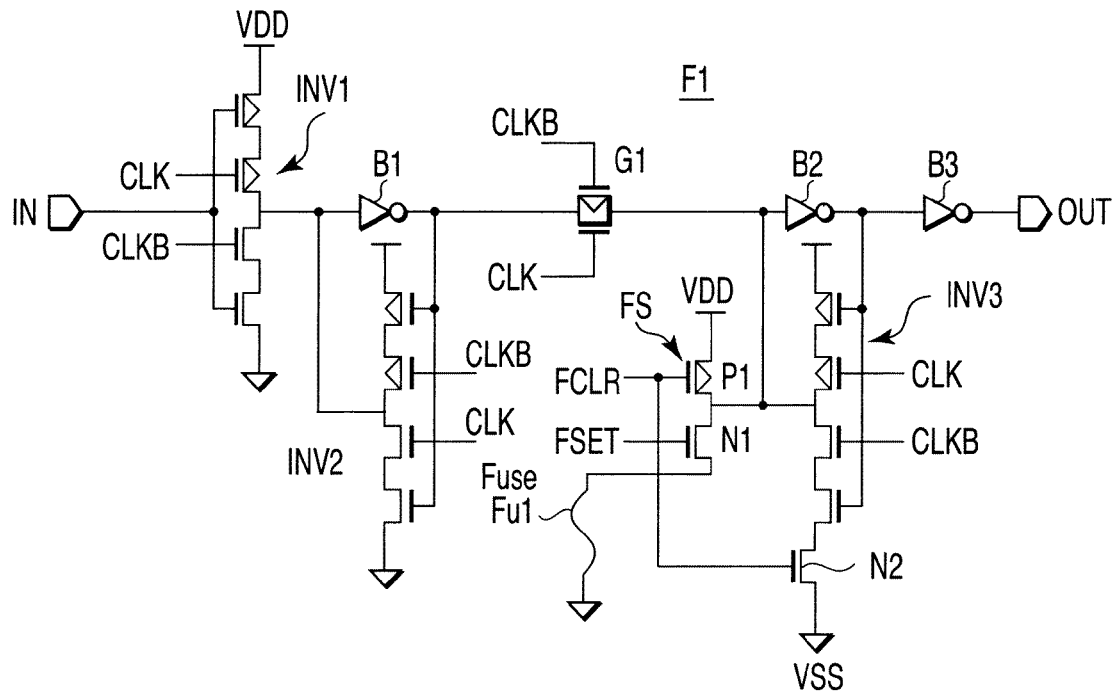
FIG. 3 is a detailed circuit diagram of a flip-flop circuit (F/F) in FIG. 2.

For example, a combination circuit between the flip-flop circuit F1 and the fuse Fu1 of FIG. 2 is provided as a configuration as shown in FIG. 3. In FIG. 3, output data on the flip-flop circuit F2 provided at a front stage of the flip-flop circuit F1 is supplied to an input terminal IN of the flip-flop circuit F1. This input terminal IN is connected to an input terminal of a clocked inverter INV1 to which clock signals CLK, CLKB in a reversed phase each other are supplied; and an output terminal thereof is connected to a buffer B1, and is connected to an output terminal of a clocked inverter INV2.

Figure 4:
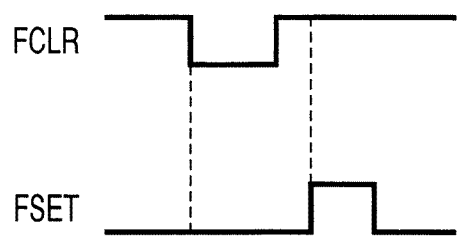
FIG. 4 is a timing chart provided for a description of an operation of FIG. 3.

An output terminal of the buffer B1 is connected to an input terminal of the clocked inverter INV2, and is connected to an input terminal of a buffer B2, an output terminal of a fuse control circuit FS, and an output terminal of a clocked inverter INV3 via a transfer gate G1. The fuse control circuit FS has a PMOS element P1, an NMOS element N1, and a fuse Fu1 connected in series between a VDD power supply terminal and a grounding terminal. An output terminal of the buffer B2 is connected to an output terminal OUT via a buffer B3, and is connected to an input terminal of the clocked inverter INV3. A low voltage side of the clocked inverter INV3 is connected to a VSS terminal via an NMOS element N2. A clear signal FCLR is supplied to a gate of this NMOS element N2 in common with a gate of the PMOS element P1. A set signal FSET is supplied to a gate of the NMOS element N1. A timing chart of these signals FCLR, FSET is shown in FIG. 4.

Now, an operation of the flip-flop circuit F1 with a configuration of FIG. 3 for fetching data programmed in a fuse Fu1 acting as a nonvolatile element will be described with reference to the timing chart of FIG. 4. This operation is an initial setting operation executed prior to the data transmitting operation. Here, assume that the fuse Fu1 of FIG. 3 is not blown off. Further, when an operation shown in FIG. 4 is performed, it is assumed that the clock signal CLK is at a level L and an inverted clock signal CLKB is at a level H. Therefore, in a state in which the signal FCLR of FIG. 4 is at a level H and the signal FSET of FIG. 4 is at a level L, the PMOS element P1 is turned off and the NMOS element N2 is turned off. In this state, when the signal FCLR becomes at a level L, the PMOS element P1 is turned on, the input terminal of the buffer B2 becomes at an H level, and the output terminal of the buffer B2 becomes at an L level. When the signal FCLR becomes at the H level, the PMOS element P1 is turned off and NMOS element N2 is turned on. As a result, since the ground side of the clocked inverter INV3 is connected with the ground terminal, a state in which the input terminal side of the buffer B2 is at an H level and the input terminal side of the clocked inverter at an L lever is latched in a latch composed of the buffer B2 and a clocked inverter INV3. Therefore, an H level is obtained at the output terminal of the butter B3 or an output terminal OUT. Here, when the signal FSET becomes at an H level, the element P1 is turned off, the NMOS element N1 is turned on and the NMOS element N2 is turned on. Since the fuse Fu1 is not blown off, the input terminal of the buffer P2 is connected with the ground terminal of the level L, the output terminal thereof becomes at a level H and an L signal representing "0" is outputted at the output terminal OUT via the buffer B3. When the signal FSET becomes at an L level, the input terminal of the buffer B2 is isolated from the ground terminal. Thus, an L level is outputted from the clocked inverter INV3 and a signal indicating "0" is maintained in a closed loop circuit formed by the buffer B2 and the clocked-inverter INV3.

While, if the fuse Fu1 is blown off, the input terminal of the buffer B2 is maintained at a state in which the input terminal is isolated from the ground terminal even if the signal FSET is at the H level in the similar manner as a case when the fuse is not blown off, and a state when the signal FCLR is at L is maintained. In this manner, data "1" is set and the shift registers 12-1 to 12-4 and 13-1 to 13-4 are initialized as illustrated in FIG. 1B. Although the inversion clock signal CLKB has been shown in FIG. 3, the clock signal CLK is shown for simplification in FIG. 1B.

Further, data set in the shift registers 13-1 to 13-4 are programmed by using the fuses such that identification number data are allocated to the respective data reception circuits and transfer data to be transmitted to the shift registers connected with the data reception circuits allocated with the identification number data are programmed in the shift registers 12-1 to 12-4.

From an output terminal of the shift register 13-1, ID number data and transfer data to be transferred to each of the receiving shift registers are outputted on 1 bit by 1 bit basis, and the outputted data are supplied to a data converter circuit 15 provided in the transmission control circuit 14. An internal clock CLK is outputted from the data converter circuit 15, and the outputted clock is supplied to each of the shift registers 12-1 to 12-4 and 13-1 to 13-4. The clock CLK is also supplied to a 5-bit counter 16-1 and a 2-bit counter 16-2 connected in series with the counter 16-1. This clock CLK is used only in the data transfer circuit 11, and transmission of transfer data to the data receiver circuits 21-1 to 21-4 is carried out in an asynchronous manner, as described later in detail.

To an output side of the 5-bit counter 16-1 is connected in a serial manner a f4-bit counter 16-3 to count a carry signal of the 5-bit counter. Carry signals of the 2-bit counter 16-2 and the 5-bit counter 16-1 are connected so as to be supplied to the data converter circuit 15 via an OR circuit 17. The carry signal of the 4-bit counter is outputted as a transfer termination signal XDONE0. These counters 16-1 to 16-3 configure a transfer managing circuit.

In the following description, reference numerals indicating input and output terminals formed in the transmission control circuit 11 and the reception control circuits 23-1 to 23-4, for example, terminals DO[0], DO[1], DO[2], ACKI, XOKI, DI0[0], DI0[1], DI0[2], ACKO_0, XOKO_0 and the like are also used in the case indicating data or signal itself which appears in these terminals other than a case indicating a terminal in order to avoid complicated description.

In the data transmission circuit 11 signal output terminals of a transfer termination signal XDONE0, a complementary data output signals DO[0] and DO[1], and a signal DO[2] for switching the transmission of the ID number data and a transmission of the data as well as signal input terminals of a reception acknowledge signal ACKI and a transmission enable signal XOKI. Detailed explanation of signals other than the transfer termination signal XDONE0 will be done lately.

1-bit data supplied from the shift register 13-1 to the data converter circuit 15 is converted to 2-bit complementary data here, and the converted complementary data is outputted from the terminals DO[0], DO[1]. Here, when original 1-bit data is "0", complementary data "1" is outputted to the terminal DO[0], and complementary data "0" is outputted to the terminal DO[1]. In addition, when original 1-bit data is "1", complementary data "0" is outputted to the terminal DO[0], and complementary data "1" is outputted to the terminal DO[1]

When two bits are supplied to the 2-bit counter 16-2, a carry signal is output from the 2-bit counter 16-2 and is supplied to the terminal DO[2]. When 5 bits are supplied to the 5-bit counter 16-1, a carry signal is output and is supplied to the terminal DO[2]. At the data converter circuit 15, there is further provided: an input terminal of a transfer completion signal XDONE0), an input terminal of the reception acknowledge signal ACKI and an input terminal of a transfer enable signal XOKI. A description will be given later in detail with respect to a signal supplied to each of these input terminals ACKI and XOKI.

The terminals DO[0], DO[1] are connected in parallel to the input terminals DI0[0], DI0[1]; DI1[0], DI1[1]; DI2[0], DI2[1]; DI3[0], DI3[1] of the reception control circuits 23-1, 23-2, 23-3 and 23-4 which are provided in association with the four 5-bit shift registers 22-1, 22-2, 22-3, 22-4 in the data receiver circuits 21-1 to 21-4. Similarly, the terminal DO[2] is connected in parallel to terminals DI0[2], DI1[2], DI2[2] and DI3[2] of the reception control circuits 23-1 to 23-4.

The output terminal XDONE0 is connected in parallel to input terminals XDONE_0, XDONE_1, XDONE_2 and XDONE_3 of the reception control circuits 23-1, 23-2, 23-3, 23-4 respectively associated with four 5-bit shift registers 22-1, 22-2, 22-3 and 22-4 in the data reception circuits 21-1, 21-2, 21-3 and 21-4.

The input terminal XOKI is connected to the input terminal XOKO_1 of the reception control circuit 23-1 provided in the data reception circuit 21-1, and the input terminal XACKI is connected to an output terminal ACKO_0 of the reception control circuit 23-1 in the data reception circuit 21-1.

In the reception control circuits respectively associated with the shift registers 22-1 to 22-4 in the data reception circuits 21-1 to 21-4 in the data receiving side, two terminals for setting ID numbers (0, 1, 2, 3) respectively allocated to the corresponding registers 22-1 to 22-4 are provided. These two-terminal pairs are respectively connected to later described comparators 25-1 to 25-4 and reception acknowledge signal control circuits 28-1 to 28-4. For example, an ID number "0" is allocated to the reception control circuit 23-1 and a 2-bit binary signal "00" representing the number "0" is set to the two terminals. The binary signals "0" and "1" may be set by connecting power terminals "VSS" and "VDD" to the two terminals. In the similar manner, the ID number setting terminals in the reception control circuit 23-2 are connected to "VSS" and "VDD" terminals, "VDD" and "VSS" terminals in the circuit 23-3, and "VDD" and "VDD" terminals in the circuit 23-4.

Reference numbers with ID numbers allocated to the shift registers 22-1 to 22-4 are added to the terminals of the reception control circuit 23-1 to 23-4. For example, the ID number of the reception control circuit 23-2 associated with the shift register 22-2 is "1" and the number "1" applied to the data input terminal DI1[0] corresponds to the ID number "1". When a reference symbol DIi[0] and an explanation i(=0, 1, 2, 3) is given in the drawing, these reference symbol and explanation imply all terminals. Thus, when DIi[0] is applied, this implies that all terminals DI0[0], DI1[0], DI2[0], and DI3[0] are designated.

Terminals DIi[0], DIi[1] (i=0, 1, 2, 3) are provided at an input side of the data conversion circuits 24-1, 24-2, 24-3, 24-4 to restore the 2-bit complementary data to the original 1-bit data.

Each of the reception control circuits 23-1, 23-2, 23-3, 23-4 has the same inner structure. These reception control circuits 23-1 to 23-4 are composed of data conversion circuits 24-1 24-2, 24-3 and 24-4, comparators 25-1, 25-2, 25-3 and 25-4, arbitrators 26-1, 26-2, 26-3 and 26-4, AND circuits 27-1, 27-2, 27-3 and 27-4 and reception acknowledge signal control circuits 28-1, 28-2, 28-3 and 28-4, respectively.

Figure 5:
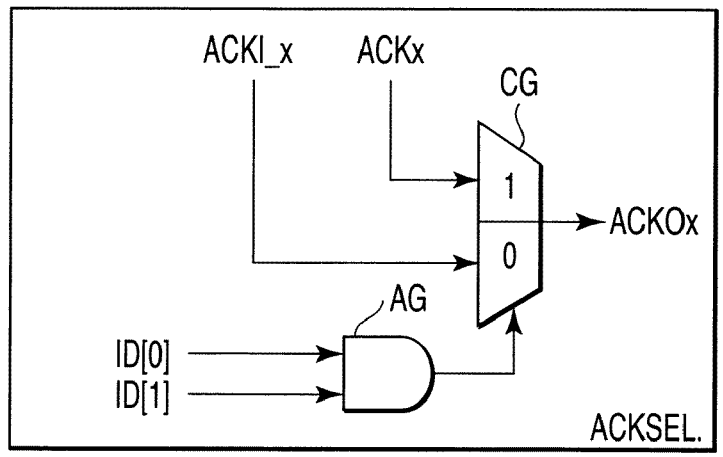
FIG. 5 is a block diagram depicting an internal configuration of a reception acknowledgement signal control circuit in FIG. 1A.
Figure 6A:
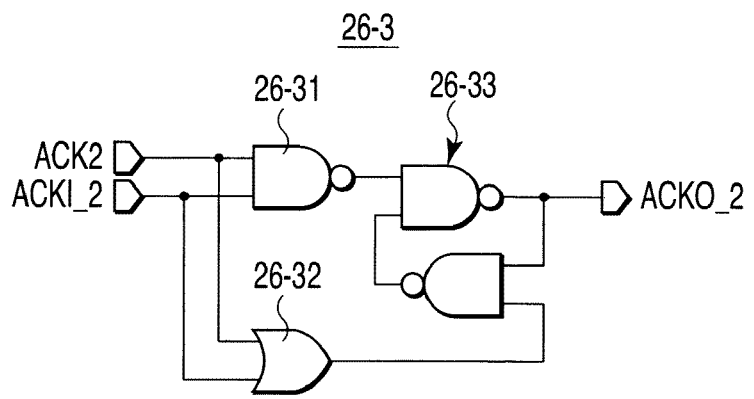
FIG. 6A is a block diagram depicting an internal configuration of an arbitrator circuit of FIG. 1A.

FIG. 6A shows a detailed circuit structure of an example of the arbitrator 26-3 and FIG. 5 shows a circuit structure of an example of the reception acknowledge signal control circuit 28-4. The arbitrators and reception acknowledge signal control circuits each has the same structure and is operated in the same manner. Detailed explanations will be given later.

The comparator 25-4 provided in the reception control circuit 23-4 acts as a data or signal reception control circuit. The data conversion circuit 24-4 restores into the original "1" or "0" 1-bit data the complementary data transmitted from the data transmission circuit 11 to the data input terminals DI3[0], DI3[1] of the reception control circuit 23-4 to supply the restored data to the comparator 25-4 and generates a reception acknowledge signal ACK3. The reception acknowledge signal ACK3 is supplied to one input terminal of the arbitrator 26-4, one input terminal of the reception acknowledge signal control circuit 28-4, and one input of the comparator 25-4. The signal ACK3 supplied to the comparator 25-4 is used as a clock signal enabled when data is inputted to the shift registers. The terminal ACKI_x of the reception acknowledge signal control circuit 28-4 is connected with the terminal ACKI_3. An output terminal ACKO_x of the reception acknowledge signal control circuit is connected to a second input terminal of the arbitrator 26-4. The arbitration output from the arbitrator 26-4 is supplied to an input terminal ACKI 2 of the recaption control circuit 23-3 from the output terminal ACKO_3.

Now, the structure and the operation of the reception acknowledge signal control circuit 28-4 will be described as an example, by referring to FIG. 5. The reception acknowledge signal control circuit 28-4 is composed of a control gate CG and an AND circuit AG. External input terminals ACKx and ACKI_x and an output terminal of the AND circuit AG are supplied to the control gate CG. The output ACKOx of the control gate CG is determined in accordance with the input of the AND circuit AG. When the output of the AND gate AG is "1", an output ACKOx corresponds to the state of the input terminal ACKx, and when "0", the state of the input terminal ACKI_x is outputted at the terminal ACKx. The output of the AND gate AG is determined in accordance with the state of the ID number setting terminals connected to the two input terminals of the AND gate AG. When the circuit is configured as shown in FIG. 5, the output of the AND circuit AG becomes at "1" only when the ID number is binary "1", "1" or "3". Namely, only in the reception acknowledge signal control circuit provided in the reception control circuit to which the ID number "3" is allocated a signal ACKI_x is outputted at the terminal ACKOx. This operation is necessary to make the arbitrator operate in line with a desired function. This function or operation will be described in detail later. To the second input terminal of the arbitrator 26-4 an input from an output ACKO_4 of a reception control circuit allocated with an ID number "4" should be supplied. However, the output ACKO_4 is not present in this embodiment. In this embodiment, the input ACKI_3 of the reception control circuit 23-4 is connected to the power source terminal "VSS" instead of receiving the output from the terminal ACKO_4. If a signal ACKI_3 is supplied directly to the second terminal of the arbitrator 26-4, a desired or intended operation is not obtained at the arbitrator 26-4.

In other words, the reception acknowledge signal control circuits 28-1 to 28-4 are provided to make the arbitrator in the reception control circuit provided at an end of the array of the reception control circuits perform the intended operations. Therefore, the internal structure of the reception acknowledge signal control circuits 28-1 to 28-4 should be modified in accordance with the number of the shift registers associated with the reception control circuits, the allocated ID numbers and the connection manner thereof.

For example, assume that the number of shift registers associated with the reception control circuits is 8 and the ID number allocated to the end of the circuit array is "7" represented by 3 bits "1", "1", "1". In this case, the AND circuit corresponding to the AND circuit AG of FIG. 5 should be of a three-input type AND circuit.

A detailed explanation of the arbitrator will be given later. In the reception control circuit 23-4, the two inputs to the arbitrator 26-4 are identical to the signal ACKO_3 and an output of the arbitrator 26-4 is identical to the signal ACK_3.

Here, turning to FIG. 1A, at the reception control circuit 23-4, there are provided: an output terminal XOKO_3 for outputting an output signal of the AND circuit 27-4 to which another transfer enable signal XOK3 is supplied together with a transfer enable signal XOKI3 of a fixed source voltage VDD; and an input terminal XDONEI_3 for receiving a transfer completion signal XDONE0 from the transmission control circuit 14. An output signal of this AND circuit 27-4 is delivered from the output terminal XOKO_3 to the input terminal XOKI_2 of next stage reception control circuit 23-3. The signal supplied to the terminal XOKI_3 will be supplied from an output XOKO_4 of a data reception circuit, if the data reception circuit allocated with an ID number "4" is provided in the similar manner as the output from the described data reception circuit. However, since such a circuit allocated with the ID number "4" is not present in this embodiment, the terminal should be supplied with a potential signal "VDD".

The 2-bit ID number data from the data converter 24-4 are sequentially sent to the comparator 25-4, and are compared with these fixed two items of data "1" "1".

Now, an example of an internal configuration of the comparator 25-4 serving as a reception managing circuit will be described here. The comparator 25-4 has: a 2-bit shift register for temporarily storing 2-bit ID number data restored by the data converter 24-4; and a switch connected to an output side of this shift register. When a carry signal from the 2-bit counter 16-2 in the transmission control circuit 11 is supplied from the input terminal DI3[2] to the comparator 25-4, the switch is turned ON. The ID number data stored in this 2-bit shift register each are connected so as to be supplied to the comparator circuit 25-4 together with a level "1" of fixed internal comparison data terminals.

When coincidence is obtained, a data path communicating with the shift register 22-4 is opened by means of an output of the comparator circuit 25-4. Further, the signal ACK3 supplied from the data conversion circuit 24-4 is enabled as a clock signal CLK3. Then, 5-bit data (DATA3) transmitted from the data transmitter circuit 11 following a carry signal supplied from the 2-bit counter 16-2 to the terminal DI3[2] is delivered to the shift register 22-4. If no coincidence is obtained, no data path is opened, and the signal ACK3 supplied from the data conversion circuit is not enabled as the clock signal CLK3. Thus, subsequent transfer data is inhibited without being supplied from this comparator 25-4 to the shift register 22-4.

Comparators 25-3 to 25-1 of other reception control circuits 23-3 to 23-1 are configured in the same way as this comparator 25-4.

The reception control circuit 23-3 is allocated with the ID number "2" represented by 2-bit binary number "10". In the same way as the reception control circuit 23-4, the 2-bit ID number data from the data conversion circuit 24-3 is sent to the comparator 25-3 one by one and is stored in the internal 2-bit shift register. When an input DI2[2] is inputted, the fixedly allocated 2-bit data "1", "0" and the 2-bit ID number data stored in the internal shift register are compared with each other. At the same time, the signal ACK2 is outputted and supplied to the first input of the arbitrator 26-3, the input terminal ACKx of the reception acknowledge signal control circuit 28-3 and the input of the comparator 25-4, respectively. The input ACKI_2 supplied with the output of the terminal ACKO_3 is supplied to the input terminal ACKI x of the reception acknowledge signal control circuit. Input terminals ID[0], ID[1] of the reception acknowledge signal control circuit 28-3 are supplied with the data "0", "1", respectively. Since the output of the AND circuit AG is "0", an output ACKI_x is delivered from the output terminal ACKO_3. Namely, a signal ACKI_2 is outputted to the terminal ACKOx. Further, this output signal is supplied to the second input of the arbitrator 26-3. An arbitration signal from the arbitrator 26-3 is supplied to the input terminal ACKI_1 of the reception control circuit 23-3 from the output terminal ACKO_3.

Figure 6B:
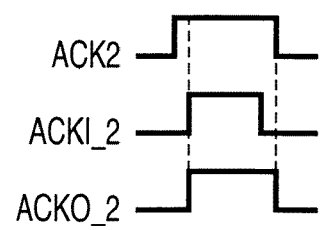
FIG. 6B is an operating waveform chart of the arbitrator shown in FIG. 6A.

Here, referring to FIGS. 6A and 6B, one example of a configuration and an operation of the arbitrator 26-3 will be described. This arbitrator 26-3 is provided as a circuit for carrying out the arbitration between the reception acknowledge signal ACKI_2 from the front stage reception control circuit 23-4 and the reception acknowledge signal generated at the internal data converter 24-3, and for forming a reception acknowledge signal ACKO_2 to be outputted from the reception control circuit 23-3 to the next stage reception control circuit 23-2. The signal ACKI_2 is inputted to the second input terminal of the arbitrator 26-3 via the reception acknowledge signal control circuit 28-3. The arbitrator 26-3 is configured to perform the arbitration between the reception acknowledge signal ACKI 2 from a former stage and a reception acknowledge signal ACK2 to output a reception acknowledge signal ACKO 2 to be outputted from the reception control circuit 23-3. The circuit configuration, as shown in FIG. 6A, is composed of: input terminals to which two reception acknowledge signals ACK2, ACKI_2 are supplied, respectively; an NAND circuit 26-31 and an OR circuit 26-32 in which a respective input side is connected to these input terminals; and a latch circuit 26-33 connected to an output terminal of each of these NAND circuit 26-31 and OR circuit 26-32.

An operation of the circuit shown in FIG. 6A will be described with reference to FIG. 6B. Before the reception acknowledge signal ACKI_2 supplied from the former stage reception control circuit 23-4 rises up, the reception acknowledge signal ACK2 from the data converter 24-3 first rises up to "1". In this state, an input of the NAND circuit 26-31 is set to "1" and "0", and thus, its output is set to "1". On the other hand, an output of the OR circuit 26-32 is "1", and thus, the state of the latch circuit 26-32 is kept unchanged, and its output ACKO_2 is held to "0".

Next, when the reception acknowledge signal ACKI_2 rises to "1", an output of the NAND circuit 26-32 is set to "0". An output of the OR circuit 26-32 is set to "1", and thus, an output of ACKO_2 rises up to "1" in response to an output from the latch circuit 26-33, as shown in FIG. 6B.

In this state, although the reception acknowledge signal ACKI_2 from the former stage is first deactivated to "0", the state of the latch circuit 26-33 is kept unchanged, and the signal ACKO_2 is also kept at "1". Next, when the signal ACK2 is deactivated, two inputs of the OR circuit 26-32 are set to "0". Thus, the state of the latch circuit 26-33 is inverted, and the signal ACKO_2 is deactivated. In this manner, arbitration of timings of two inputs ACK2, ACKI_2 is carried out.

The two input signals supplied to the arbitrator 26-4 of the reception control circuit 23-4 are configured similarly with the signal ACK3. Therefore, the levels of these two input signals move always in the similar manner. Since the arbitrator operates along the above-mentioned principle, a signal identical to the signal ACK3 is outputted from the output terminal ACKOx.

If a coincidence output is obtained from the comparator 25-3, a data path is opened by the comparator output to enable the signal ACK2 supplied from the data conversion circuit 24-3 as a clock signal CLK2. As a result, a 5-bit transmission data DATA2 transmitted from the data transmission circuit 11 following a carry signal supplied to the terminal DI2[2] form the 2-bit counter 16-2 is supplied to the shift register 22-3 shown in FIG. 1A together with the clock signal CLK2. When no coincidence is obtained, the following data is inhibited since this data should not be stored in the shift register 22-3.

The input terminal XOKI_2 is connected to one input terminal of the AND circuit 27-3, and a transfer enable signal XOK2 is supplied to the other input terminal of the AND circuit 27-3. Its output is forwarded to an output terminal XOKO_2, and further, is supplied to the input terminal XOKI_1 of following stage reception control circuit 23-2. At the reception control circuit 23-3, there is provided an input terminal XDONEI_2 which receives another transmission completion signal XDONE from the transmission control circuit 14 of FIG. 1B.

The reception control circuit 23-2 of the next stage data receiver circuit 21-2 is allocated with an ID number "1", i.e., 2-bit binary number "01". The 2-bit ID number data from the data converter 24-2 are sequentially sent to the comparator 25-2, and the sent data are temporarily stored in the internal shift register. When a signal arrives at the terminal DI1[2], the stored 2-bit data is compared with these fixed data "0", "1". When coincidence is obtained, the subsequent 5-bit transfer data is stored in the shift register 22-2.

Similarly, since the ID number allocated to the reception control circuit 23-1 is set to "0", i.e., 2-bit binary number "0", the 2-bit ID number data from the data converter 24-1 are sequentially sent to the comparator 25-1, and the sent data are temporarily stored in the 2-bit shift register. Then, the temporarily stored data is compared with these fixed data "0", "0" upon the receipt of a signal supplied to the terminal DI0[2]. When coincidence is obtained, the following 5-bit transmission data is stored in the shift register 22-1.

Now, an operation according to an embodiment shown in FIGS. 1A and 1B will be described here. Prior to starting of the data transmission operation, 4 sets of 7-bit transmission data composed of 5-bit transmission data and 2-bit ID number data are stored in the 5-bit shift registers 12-1 to 12-4 and 2-bit shift registers 13-1 to 13-4. Further, data transfer is started, the counters 16-1 to 16-3 provided in the transmission managing circuit are reset to zero.

Before starting data transfer, a transfer enable signal XOKI_i must be set to "1" in the receiving shift registers 22-1 to 22-4 of all the data receiver circuits 21-1 to 21-4. Further, a terminal of a transfer enable signal XOKI_3 of the reception control circuit 23-4 is not connected with a circuit at the former stage, and thus, is connected to, for example, a VDD power source, and is always fixed to "1". When a state in which transfer can be started is established, the transfer enable signals XOKi (i=0, 1, 2, 3) supplied from the outside are set to all "1" at a time point at which t=0, as shown in (d), (g), (j) and (m) in FIG. 7. The transfer enable signal XOKI_3 is set to "1" beforehand, as shown in (l) in FIG. 7. As a result, in the reception control circuit 23-4, the transfer enable signal XOKO_3 is set to "1" at substantially the same time as shown in (k) in FIG. 7, and the transfer enable signal XOKI_2 in the reception control circuit 23-3 is set to "1" with a slight delay.

With respect to this transfer enable signal XOKI_2, a logical product with the signal XOK2 is obtained by the AND circuit 27-3, and further, the signal XOKO_2 shown in (h) in FIG. 7 is set to "1" at substantially the same time.

Similarly, in the reception control circuit 23-2, a logical product between the signals XOKI_1 and XOK1 is obtained by the AND circuit 27-2, and the transfer enable signal XOKO_1 shown in (e) in FIG. 7 is set to "1". In the reception control circuit 23-1, a logical product between the signals XOKI_0 and XOK0 is obtained by the AND circuit 27-1, and the transfer enable signal XOKO_1 shown in (e) in FIG. 7 is set to "1". The lastly obtained transfer enable signal XOKO_0 set to "1" is supplied as a transfer enable signal XOKI set to "1" to the data converter 15 of the transmission control circuit 14 at a timing of t=1 with a further delay, as shown in (a) in FIG. 7.

In this manner, when the transfer enable signal XOKI set to "1" is supplied from the data receiver circuits 21-1 to 21-4 to the data converter 15, the clock CLK is supplied from the data converter 15 to all the shift registers 12-1 to 12-4 and 13-1 to 13-4 and the counters 16-1 and 16-2 in the data transmitter circuit 11. As a result, a bit data string starting from the ID number data stored in the shift register 13-1 of the data transmitter circuit 11 is supplied to the data converter 15 in a bit-by-bit manner.

Figure 8:
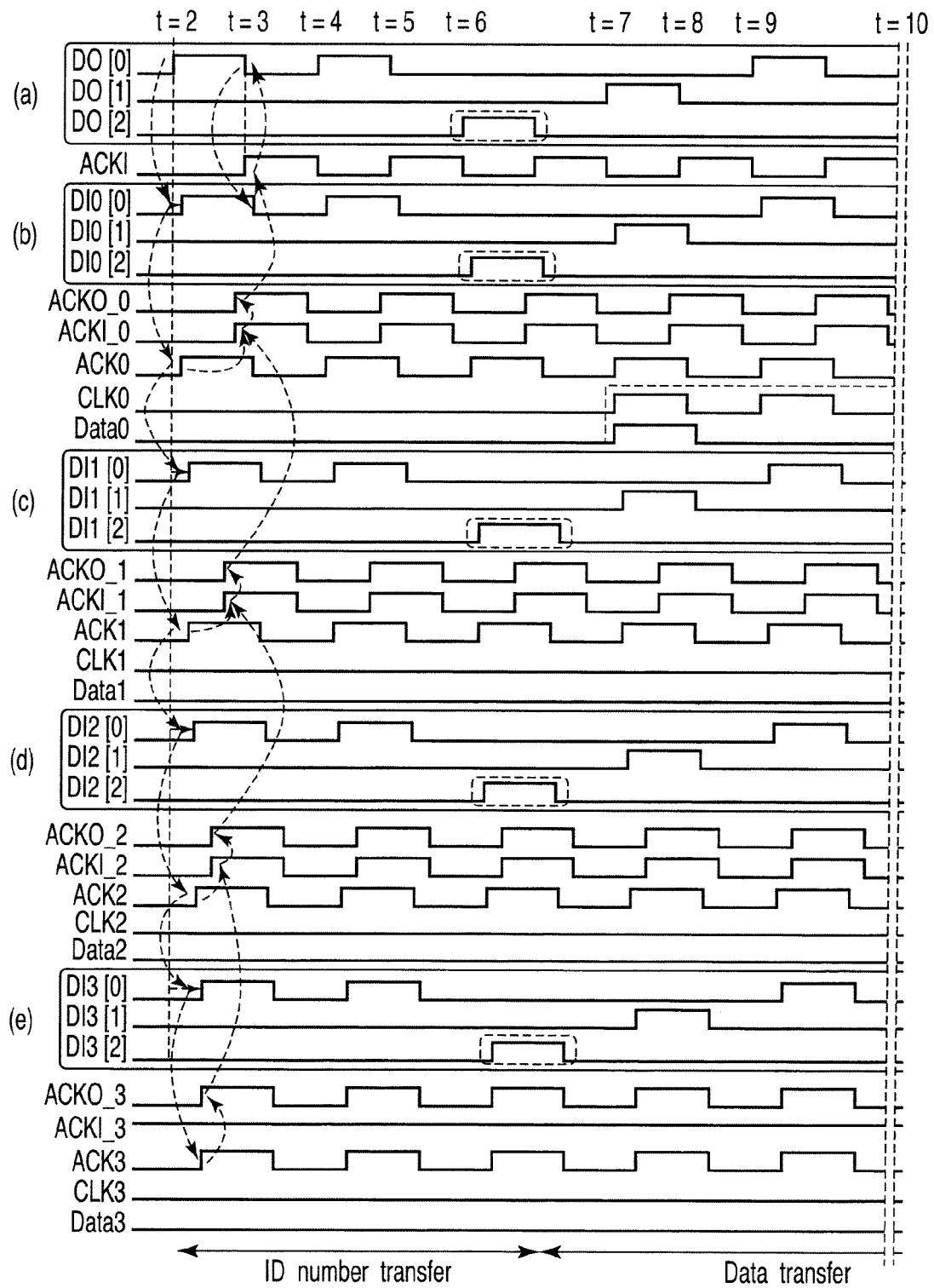
FIG. 8 is an operating waveform chart showing a whole operation of the circuit of FIGS. 1A and 1B.

The first bit data "0" on data indicating an ID number "0" stored in the shift register 13-1 is supplied to the data converter 15, and each bit of the supplied data is converted into 2-bit data DO[0], DO[1]. Then, the converted 2-bit data is supplied with a transfer delay of respective transmission lines to the four reception control circuits 23-1 to 23-4 in the data receiver circuits 21-1 to 21-4. Then, the supplied data is restored to original 1-bit data "0" by means of the data converters 24-1 to 24-4, respectively. The "0" bit data is supplied to the comparators 25-1 to 25-4, respectively. FIG. 8 shows a state in which the first bit data "0" is supplied to the comparators 25-1 to 25-4.

The waveforms of three signals shown in (a) in FIG. 8 are provided as waveforms of the output data DO[0], DO[1] and DO[2] from the data converter 15. These items of output data DO[0], DO[1] and DO[2] are transferred from the data transmitter circuit 11 to the reception control circuits 23-1 to 23-4 via transmission lines with respective different lengths. Assume now that a length from the data transmitter circuit 11 to the reception control circuit 23-1 is the shortest and less in delay, and a length from the circuit 11 to the reception control circuit 23-4 is the longest and large in delay, in FIG. 8.

Therefore, as shown in FIG. 8, data DI1[0] of the reception control circuit 23-1 in (c) in FIG. 8 is slower than an input timing of input data DI0[0] shown in (b) in FIG. 8. Then, a delay is larger in order of data DI2[0] in (d) in FIG. 8 and data DI3[0] in (e) in FIG. 8.

That is, as shown in (b) in FIG. 8, when complementary input data DI0[0] and DI0[1] are inputted to the data converter 24-1, the reception acknowledge signal ACK0 is set to "1". On the other hand, the input data DI1[0] is set to "1" to be slightly slower than the above setting, as shown in (c) in FIG. 8. The thus set input data is inputted to the data converter 24-2 together with data DI1[1], and the reception acknowledge signal ACK1 is set to "1". Further, with a slight delay, as shown in (d) in FIG. 8, the input data DI2[0] is set to "1". The thus set input data is inputted to the data converter 24-3 together with the data DI2[1], and the reception acknowledge signal ACK2 is set to "1". With a further delay, as shown in (e) in FIG. 8, the input data DI3[0] is set to "1". The thus set input data is inputted to the data converter 24-4 together with the data DI3[1], and the reception acknowledge signal ACK3 is set to "1".

When the reception acknowledge signal ACK3 is set to "1", the output ACKO_3 of the reception control circuit 23-4 is set to "1". Then, the input ACKI_2 of the reception control circuit 23-3 at the next stage is set to "1", and the output ACKO_2 is set to "1". As a result, the ACKO_2 of the reception control circuit 23-3 is set to "1"; the input ACKI_1 of the reception control circuit 23-2 at the next stage is set to "1"; and the output ACKO_1 is set to "1".

Similarly, when the reception acknowledge signal ACKI of the data converter 15 is set to "1" at a time point at which t=3, the first output data DO[0] fall down to "0" as shown in (a) in FIG. 8. Then, the first 1-bit of the 2-bit ID number data is stored in the first stage of the 2-bit shift registers provided at the inside of the comparators 25-1 to 25-4 via the data converters 24-1 to 24-4 of all the reception control circuits 23-1 to 23-4. When data DO[0] is fallen down to "0", the data DIi[0] is fallen down to "0" in the similar manner as the case where the data DO[0] rises up to "1". As a result, the reception acknowledge signal ACKi is fallen down to "0" in the similar manner as the case where the data DO[0] rises up to "1". Accordingly, the signal ACKI is fallen down to "0" at a time t=4 to set a state in which the following data can be transmitted.

When the reception acknowledge signal ACKI is fallen down to "0", transfer of the second bit of ID number data is restarted from a time point of t=4. Transfer of the second bit of the ID number data is carried out similarly when the first bit is transferred, this transfer terminates at a time point of t=5. At t=6 a state in which the following data can be transmitted is established. When the second bit transfer terminates, the ID number data "0", "0" stored in the first transmitting shift register 13-1 are delivered. Then, a carry signal from the 2-bit counter 16-2 is sent to the data converter 15 via the OR circuit 17.

The data converter 15 having received this carry signal transmits a data transfer completion signal DO[2] to the data receiver circuits 21-1 to 21-4 at a time point of t=6. This signal DO[2] is affected by a delay of a transmission line as is the case with the ID number data. Then, the transmitted signal is supplied to the reception control circuits 23-1 to 23-4 with a predetermined time delay which are different from each other, as shown in (b) to (e) in FIG. 9. As a result, transfer of 2-bit ID number data terminates; there opens only a data path of the comparator 25-1 of the reception control circuit 23-1 in the data receiver circuit 21-1 to which ID=0 is allocated; and a preparation for accepting the following 5-bit data to the shift register 22-1 completes.

In this state, when the reception acknowledge signal ACKI becomes to "0", the clock CLK is generated from the data converter 15 at a time point of t=7, as shown in FIG. 8. The first bit "1" of 5-bit data stored in the shift register 12-1 is converted into the complementary data DO[0] and DO[1], and the converted data is outputted.

The complementary data corresponding to the first bit data "1" are transmitted to all the reception control circuits 23-1 to 23-4 as is the case with the ID number data. However, only a data path reaching the shift register 22-1 is opened in accordance with the ID number "0" and only the clock signal CLK1 caused by the signal ACK1 is enabled, and the restored first data "1" is supplied to the shift register 22-1 at a time point of t=8.

Next, at a time point of t=9, transfer of the second bit data "0" in the shift register 12-1 is started, and, at a time point of t=10, transfer of the second data "0" to the shift register 22-1 is completed. Similarly, all the 5-bit data in the shift register 12-1 are transferred one by one to the shift register 22-1.

When transfer of the 5-bit data in the shift register 12-1 terminates, a carry signal set to "1" is sent from the 5-bit counter 16-1 to the 4-bit counter 16-3. The contents of the signal are incremented by 1, and the incremented signal is sent to the data converter 15 via the OR circuit 17. As a result, the data transfer completion signal DO[2] of the data converter 15 is set to "1" at a time point of t=11 as shown in (a) in FIG. 9. This signal DO[2] is supplied to input terminals DI0[2] to DI3[2] of all the reception control circuits 23-1 to 23-4 of the data receiver circuits 21-1 to 21-4 through the transmission lines as is the case with the ID number data DO[0] and DO[1] which have been already described. Upon the receipt of this data transfer completion signal DO[2], the respective reception control circuits are set to a state for receiving the ID number data. At this time, as shown in (b) to (e) in FIG. 9, the signal DO[2] is subjected to a delay specific to each of the transmission lines, as is the case with the already transferred data.

By the above-described operation, transfer of the 5-bit data in the shift register 12-1 to the shift register 22-1 is terminated based on the ID number data stored in the first shift register 13-1 of the data transmitter circuit 11. At this time, the second ID number data "10" first stored in the shift register 13-2 has moved to the shift register 13-1, and the next 5-bit data "01010" associated therewith is stored in the shift register 12-1.

Figure 9:
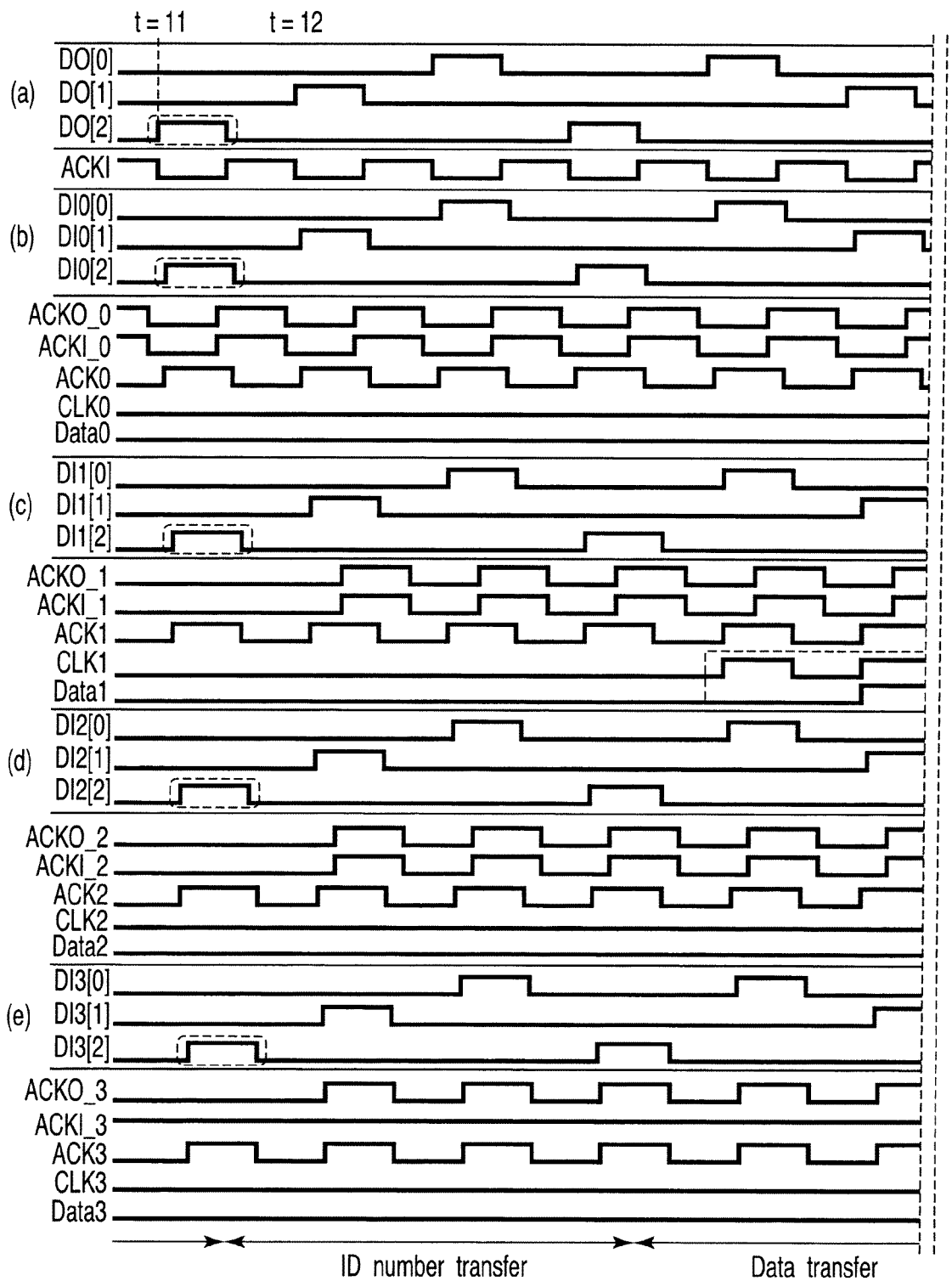
FIG. 9 is an operating waveform chart showing a whole operation of the circuit of FIGS. 1A and 1B following FIG. 8.

In this state, the first bit held in the shift register 13-1 is "1", and thus, the complementary data DO[1] outputted at a time point of t=12 in (a) in FIG. 9 is set to "1", and DO[0] is set to "0". This complementary data is transferred to the data receiver circuits 21-1 to 21-4. However, in the subsequent operation, like an operation from t=2 in FIG. 8 to t=11 in FIG. 9, the 2-bit ID number data "10" is first transferred, and then, 5-bit data "01010" is transferred to the shift register 22-2 specified in accordance with the ID number data "10". When transfer of this 5-bit data has completed, the 4-bit counter 16-3 is 1-incremented by the carry signal from the 5-bit counter 16-1.

Similarly, the 5-bit data "00111" stored in the shift register 12-3 is transferred to the shift register 22-3, and the 5-bit data "10001" stored in the shift register 12-4 is transferred to the shift register 22-4. When all the 5-bit data of the last shift register 12-4 have been transferred to the shift register 22-4, a carry signal set to "1" is sent as the transfer completion signal XDONE0 from the 4-bit counter 16-3 to the data converter 15. At the same time, this carry signal is sent to each of the input terminals XDONEI_i of the data receiver circuits 21-1 to 21-4, and these terminal levels are set to "1".

Figure 10:
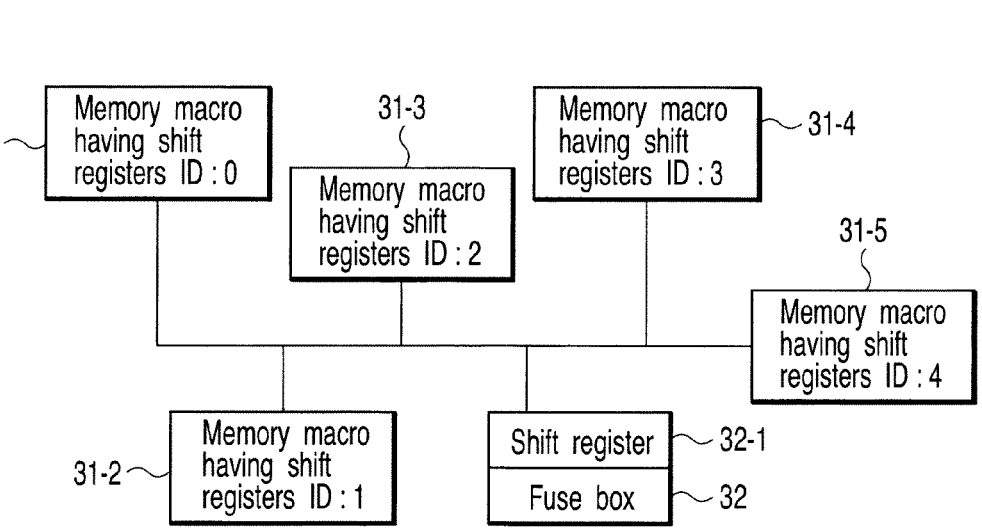
FIG. 10 is an operating waveform chart of a transfer completion signal in the circuit of FIG. 1A.

FIG. 10 shows how this transfer completion signal XDONE0 is generated, and is transferred to each of the input terminals XDONEI_i of the same signal. As shown in FIG. 10, a delay of transmission to the data receiver circuit 21-1 is the least, and a delay of transmission to the data receiver circuit 21-4 is the largest.

In addition, in an example of FIGS. 1A and 1B, 5 data bits are transferred to each of the receiving shift registers 22-1 to 22-4, which is the same as the above case. However, the transmission control circuit 14 has plural types of counters corresponding to the number of transmission bits, thereby making it possible to cope with data transfer with a different number of bits.

Clock signals ACKI, ACKO, ACK1, ACK2 and ACK3 are used as clock signals for shifting data in the shift registers provided in the data transmission circuit 11 and data reception circuits 21-1 to 21-4. The oscillation frequencies of these clock signals are determined in accordance with a delay caused in the transmission lines and a delay caused in the transmission circuits. The shorter is the period of the delay, higher is the oscillation frequency of the clock signal. When the frequency of the clock signal does not provide a sufficient margin for a normal operation of a shift register, it is necessary to lower the frequency of the clock signal. For example, delay elements such as resistance elements and capacitance elements may be provided in the data conversion circuit 15 and/or data conversion circuits 24-1 to 24-4 to lower the speed of the data conversion operation thereof for lowering the frequency of the clock signal.

Now, a description will be given with respect to an embodiment in the case where the circuit embodied in FIGS. 1A and 1B are mounted on a memory system using a semiconductor memory. The semiconductor memory has a function for saving a faulty bit by using a redundancy cell and a function for trimming a circuit operation. The data required for that purpose is stored in a nonvolatile fuse element group in the semiconductor memory. When operation of the memory system starts, this data must be stored in a predetermined register in the semiconductor memory.

In addition, the semiconductor memory may be composed of a plurality of macros. In this case, registers for storing fuse data separately exist in respective macros. The fuse groups required for the respective macros are held in batch (hereinafter, referred to a fuse box) independent of the macros. When initialization is carried out, the data is temporarily stored in a shift register, and thus, is transferred to another shift register, the embodiment of FIGS. 1A and 1B are valid.

Figure 11:
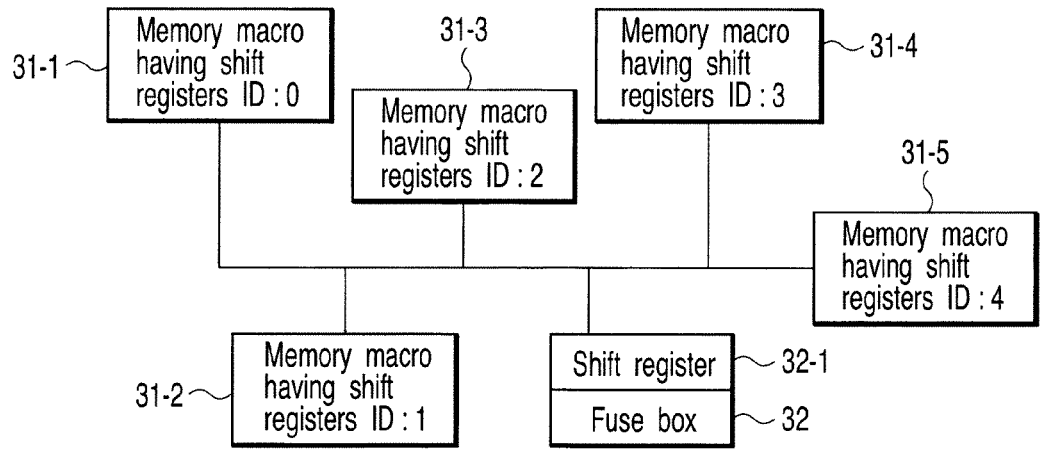
FIG. 11 is a block diagram depicting a configuration in the case where the embodiment circuit of FIGS. 1A and 1B is applied to a semiconductor memory having a redundancy circuit.

For example, as shown in FIG. 11, receiving shift registers (not shown) comprising reception control circuits are provided at respective memory macros 31-1 to 31-5, and the respective ID numbers are allocated. In this case, there is a need for allocating the ID numbers to five shift registers, and thus, the ID number data has a 3-bit configuration. The memory macros 31-1 to 31-5 are connected to a fuse box 32 via a transmission line such as a bus, respectively. This fuse box 32 is a part of the semiconductor memory, and has at its inside a transmitting shift register 32-1 comprising a transmission control circuit together with a fuse group serving as a nonvolatile memory element group.

During initialization, fuse data serving as transmission data stored in the fuse group in the fuse box 32 is set to the shift register 32-1 together with the ID number data, whereby data can be transferred to the shift register in each of the memory macros 31-1 to 31-5 as in the embodiment of FIGS. 1A and 1B.

In addition, for example, in the case where the trimming data is commonly used in all the memory macros, the corresponding data may be held in only one fuse set, and the output data may be switched by a transmission control circuit, whereby the data can also be transferred.

Figure 12:
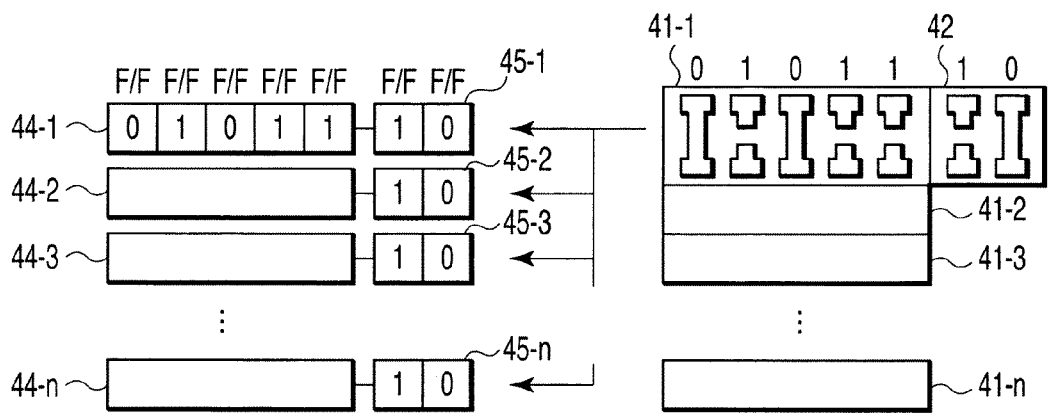
FIG. 12 is a block diagram depicting a configuration in the case where the embodiment configuration of FIGS. 1A and 1B is applied in the case where trimming data is provided as data equal to each other in all macros.

FIG. 12 schematically shows a configuration of an embodiment of the present invention using a common trimming data. In the figure, a plurality of fuse groups 41-1 to 41-n with the respective 5-bit configurations are provided at the transmission side, and further, trimming data "10" for common trimming is stored in a single fuse set 42. The trimming data is sent to each of shift registers 45-1 to 45-n attached to each of a plurality of receiving shift registers 44-1 to 44-n, and trimming of memory macro may be carried out by using the data contained in these shift registers 44-1 to 44-n.

Although not shown, as in the first embodiment of FIGS. 1A and 1B, the data contained in the transmitting side shift registers 41-1 to 44-n is transferred while transmission data is switched by a transmission control circuit (not shown). Similarly, of course, transfer data contained in the receiving shift registers 44-1 to 44-*n* is received by a reception control circuit (not shown).

As has been described above, according to the present embodiment, the data stored in the transmitting shift register can be reliably transferred to the receiving side shift register without an occurrence of a transmission error caused by a delay distortion of a transmission line.

Second Embodiment

Figure 13:
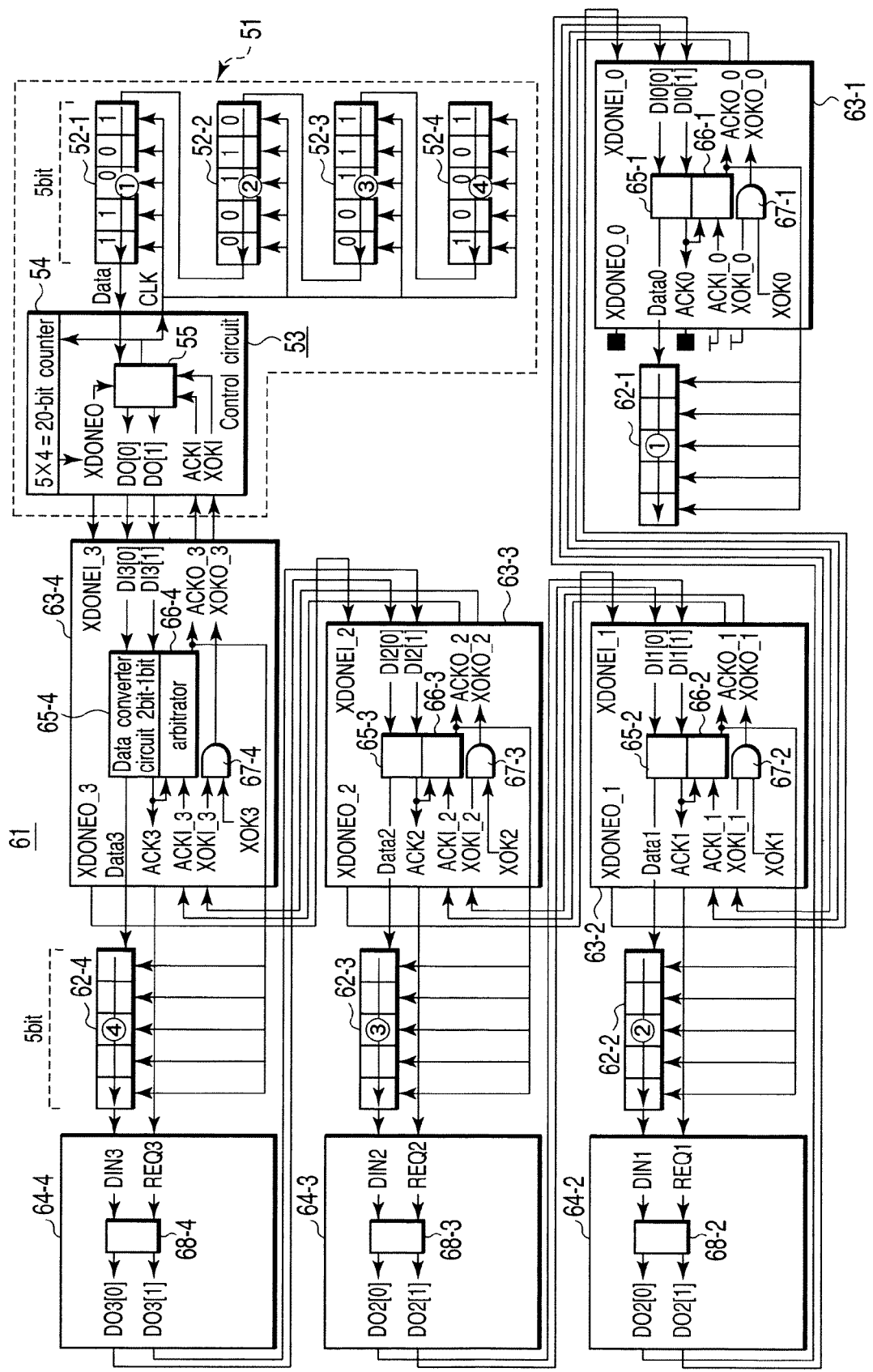
FIG. 13 is a block diagram depicting a whole configuration according to a second embodiment of the present invention.

FIG. 13 is a block diagram depicting a whole configuration of a second embodiment of the present invention. In the embodiment, in a data receiver circuit, a plurality of receiving side shift registers are serially connected with control circuits connected to an input side and an output side of each of the shift registers. Further, these receiving side shift registers are serially connected to shift registers provided in the data transmission circuit to transmit data held in the transmission side shift register. In this embodiment, no control circuit may be provided at the output end of the receiving side shift register in the final stage. In this embodiment, 4 sets of 5-bit data are transmitted to four receiving side shift registers as in the first embodiment. In addition, when the data transferring operation starts, all the receiving shift registers should have been set to "0".

First, a circuit configuration will be described here. In a data transmitter circuit 51, four shift registers 52-1 to 52-4 with a 5-bit configuration are serially connected. In the shift registers 52-1 to 52-4, as in the first embodiment of FIGS. 1A and 1B, data to be transferred to the receiving shift register is assumed to be generated by a nonvolatile element using a fuse. However, unlike the embodiment of FIGS. 1A and 1B, no ID number data is used.

A transmission control circuit 53 is further provided in the data transmitter circuit 51, and a 20-bit counter 54 operating as a transfer managing circuit is provided therein. Further, there is provided a data converter 55 for receiving a carry signal output from this counter 54 and converting 1-bit data into 2-bit complementary data DO[0] and DO[1]. The data converter 55, as in the embodiment of FIGS. 1A and 1B, receives a reception acknowledge signal ACKI and a transfer enable signal XOKI from a data receiver circuit 61 and generates a clock CLK. Then, this data converter 55 supplies the generated clock to the shift registers 52-1 to 52-4 and to the 20-bit counter 54. The data converter 55 is configured so as to generate a signal DO[2] when the counter 54 receives 20 clocks and generates a carry signal as a data transfer completion signal XDONE0.

The data receiver circuit 61 is composed of: four 5-bit shift registers 62-1 to 62-4; four input control circuits 63-1 to 63-4 connected to input sides of these shift registers 62-1 to 62-4; and three output control circuits 64-2 to 64-4 connected to output sides of the shift registers 62-2 to 62-4. As described previously, no output control circuit is connected to an output side of the furthest shift register 62-1 viewed from the data transmitter circuit 51.

In an input control circuit 63-4 which first receives data from the data transmitter circuit 51, there are provided: a data converter 65-4 which receives input terminals DI3[0], DI3[1] of 2-bit complementary data from the transmission control circuit 53 and converts the received data to original 1-bit data; an arbitrator 66-4 which carries out arbitration between a reception acknowledge signal ACK3 from this data converter 65-4 and a reception acknowledge signal ACKI_3 from an input control circuit 63-3 at the rear stage and generating an internal clock CLK3; and an AND circuit 67-4 which com-putes a logical product between this internal clock CLK3 and a transfer enable signal XOKI_3 from the input control circuit 63-3 at the rear stage. This internal clock CLK3 is supplied to the shift register 62-4 for the purpose of data shifting.

At the shift register 62-4 connected to the output side of this input control circuit 63-4, there is provided: a data converter 68-4 which converts 1-bit data to 2-bit complementary data DO3[0] and DO3[1] again and supplies the converted data to input terminals DI2[0] and DI2[1] of the input control circuit 63-3.

Like the input control circuit 63-3 as well, there are provided: a data converter 65-3 which receives data on input terminals DI2 [0] and DI2 [1] of 2-bit complementary data from the transmission control circuit 64-4 and converts the received data to original 1-bit data; an arbitrator 66-3 which carries out arbitration between a reception acknowledge signal ACK2 from this data converter 65-3 and a reception acknowledge signal ACKI_2 from an input control circuit 63-2 at the rear stage and generates an internal clock CLK2; and an AND circuit 67-3 which computes a logical product between this internal clock CLK2 and a transfer enable signal XOKI_2 from the input control circuit 63-2 at the rear stage. This internal clock CLK2 is supplied to the shift register 62-3 for the purpose of data shifting.

Similarly, the output data of the input control circuit 63-3 is supplied from the shift register 62-3 to the input control circuit 63-2 via the output control circuit 64-3. The output data of the input control circuit 63-2 is supplied from the shift register 62-2 to the input control circuit 63-1 via the output control circuit 64-2, and the output data of the input control circuit 63-1 is supplied to the shift register 62-1.

Figure 14:
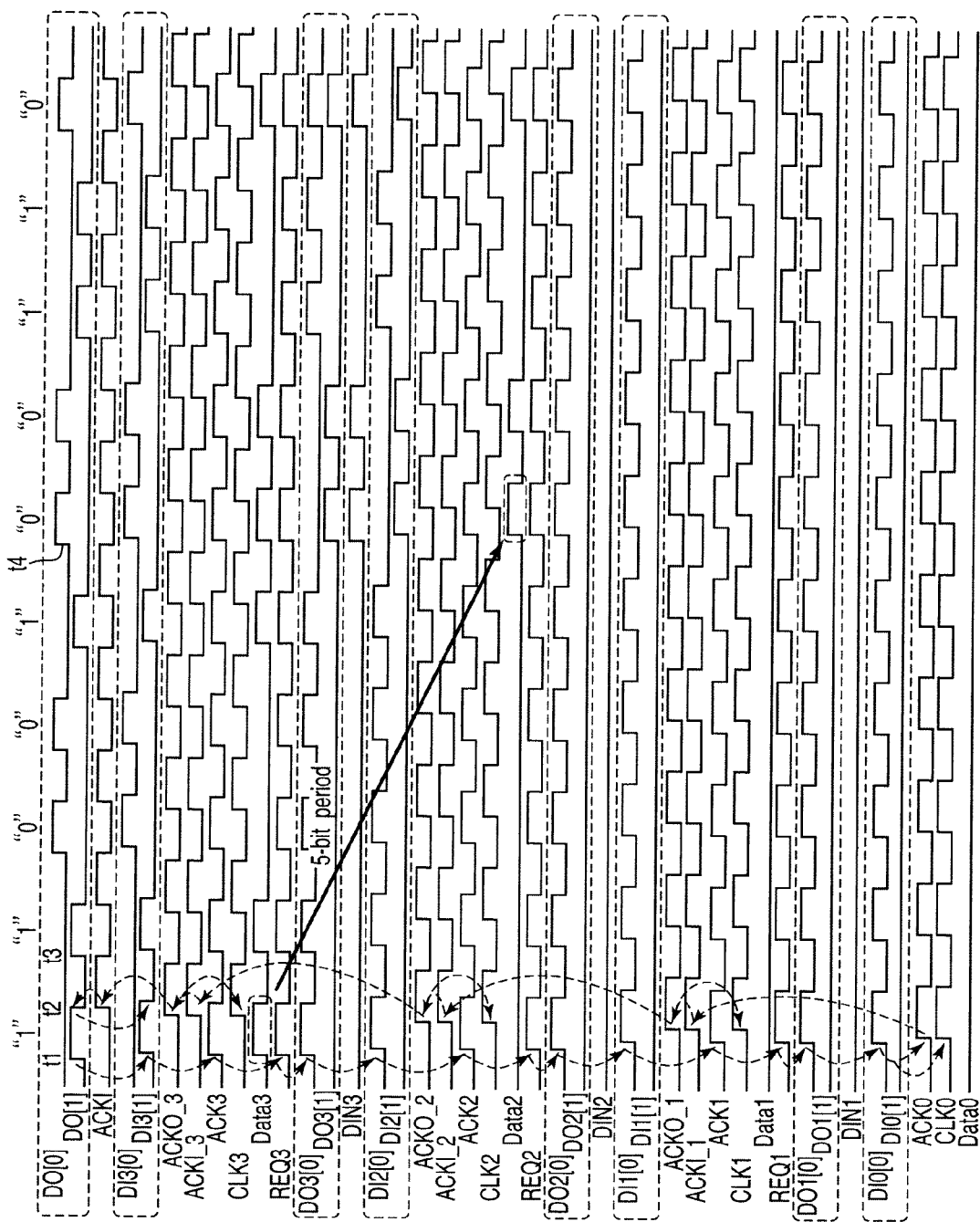
FIG. 14 is an operating waveform chart provided to describe a whole operation of the circuit of FIG. 13.

Now, a circuit operation according to the embodiment of FIG. 13 will be described with respect to a case in which the first 5-bit data "11001" stored in the first shift register 52-1 is transferred to the shift register 62-1 with reference to a timing chart of FIG. 14. When data transferring is started, as in the first embodiment, it is necessary that all the transfer enable signals XOKO_i outputted from the reception control circuits 63-1 to 63-4 in the data receiver circuit 61 are set to "1" and that the transfer enable signal XOKI supplied to the data converter 55 is set to "1".

When the data transferring is started, the first data bit "1" is sent from the shift register 52-1 to the data converter 55. Then, the sent data is converted into 2-bit complementary data DO[0] and DO[1], and the converted data are outputted at a time point of t1. Here, data bit is set to "1", and thus, DO[1] is set to "1".

In this manner, 2-bit complementary data is supplied from the input terminals DI3[0], and DI3[1] to the data converter 65-4; the supplied data is converted into 1-bit data "1"; and the converted data is outputted to an output terminal Data3. The data "1" outputted to this terminal Data3 is shifted in the left direction in the figure on 1-bit by bit basis in the shift register 62-4. In order to achieve this, a reception acknowledge signal ACKO_3 from the arbitrator 66-4 must be supplied as a clock to the shift register 62-4. In order to achieve this, a reception acknowledge signal ACKI_3 from the reception control circuit 63-3 at the former stage must be supplied to the arbitrator 66-4.

On the other hand, in order to ensure that the signal ACKO_2 which is a source of the reception acknowledge signal ACKO_3 is outputted from the reception control circuit 63-3, the reception acknowledge signal ACKO_1 must be outputted from the reception control circuit 63-2 at the former stage. This reception acknowledge signal ACKO_1 is based on an output ACKO_0 from the arbitrator 66-1 of the reception control circuit 63-1 at the final stage. As a result, complementary data is supplied to the data converter circuit 65-1; a signal ACKO is supplied to the arbitrator 66-1; and a signal ACKO_0 is supplied as an internal clock of the reception control circuit 63-1 to the shift register 62-1.

Therefore, the sequence of generating the internal clocks is in ascending order of the reception control circuits 63-1, 63-2, 63-3 and 63-4.

When an internal clock ACKO_3 of the reception control circuit 63-4 is generated, the first "1" data bit is latched by a first register of the shift register 62-4 in the data receiver circuit 61, and the remaining registers are set to all "0". Therefore, at a time point of t1 in FIG. 14, the complementary data at the terminal DO3[0], DO2[0] and DO1[0] are set to "1".

As described above, upon the receipt of these complementary data, the reception acknowledge signals ACK3 to ACK0 from the data converters 65-4 to 65-1 of the reception control circuits 63-4 to 63-1 set to "1", respectively, are supplied to one input terminals of the arbitrators 66-4 to 66-1. In this state, the other end of the arbitrators 66-4 to 66-1 are set in a waiting state until the reception acknowledge signals ACKI_3, ACK_2 and ACKI_1 from the input control circuits 63-3, 63-2 and 63-1 at the next stage are set to "1". Here, a signal "1" from a fixed power source such as, for example, a VDD power source, is configured so as to be always supplied as the transfer enable signal XOKI_0 of the input control circuit 63-1 at the final stage. In addition, as has been described in FIG. 5, the reception acknowledge signals are supplied to two input terminals of the arbitrator at the same time.

On the other hand, the reception acknowledge signal ACK3 is further outputted to a terminal REQ3 of the output control circuit 64-4. In response to this reception acknowledge signal ACK3, the data at the terminal of the shift register 62-4 inputted from a terminal DIN3 is converted into 2-bit complementary data by the data converter 68-4. Then, the converted data is outputted to the input control circuit 63-3 of the receiving shift register 62-3 at the next stage. Upon the receipt of this, similar operation is further made in the receiving shift register 62-2 at the next stage, and data "0" is outputted to the shift register 62-1 at the next stage. By this operation, when data is conveyed to the receiving shift register 62-1 at the final stage, a reception acknowledge signal ACKO_0 set to "1" is outputted from the arbitrator 66-1 by the output signal ACKO of the data converter 65-1. This signal ACKO_0 is sent as a reception acknowledge signal ACKI_1 set to "1" to the input control circuit 63-2 at the former stage, and a reception acknowledge signal ACKO_1 set to "1" is generated from the arbitrator 66-2. This signal ACKO_1 is further sent as a reception acknowledge signal ACKI_2 set to "1", to the input control circuit 63-3 at the former stage; and a signal ACKO_2 set to "1" is sent as a signal ACKI_3 from the arbitrator 66-3 to the input control circuit 63-4 at the first stage. In this manner, in the respective reception control circuits 63-1 to 63-4, a shift is carried out with ACKO_i being a clock; the reception acknowledge signals ACKI_i are set to "1" one after another; and finally, a signal ACKO_3 is set to "1".

As a result, the reception acknowledge signal ACKI of the transmission control circuit 53 is set to "1", and at a time point of t2, complementary data DO[1] falls down to "0". Next, at a similar path, at a time point of t3, when the reception acknowledge signal ACKI is set to "0", the data bit "1" first stored in a second register of the transmitting shift register 52-1 is outputted.

Similarly, 5-bit data "11001" stored in the first shift register 52-1 of the data transmitter circuit 51 is transferred to the first shift register 62-4 of the data receiver circuit 61. At this time, in the shift register 52-1, there is shifted and stored the next 5-bit data "00110" (refer to FIG. 15) stored in the shift register 52-2 at a time point at which transferring is started.

At a time point of t4, when the reception acknowledge signal ACKI is set to "0", data bit "0" is outputted from a first register of the transmitting shift register 52-1, and the complementary data DI3[0] in the reception control circuit 63-4 is set to "1". When the complementary data DI3[0], DI3[1] are sent to the receiving shift register 62-4, the data contained in the final stage register of the shift register 62-4 is sent as Data2 from the data converter 65-3 of the reception control circuit 63-3 at the next stage to the first register of the shift register 62-3. That is, as indicated by an arrow in FIG. 14, in a state in which the first 5-bit data "1001" stored in the shift register 52-1 has been shifted to the shift register 62-4, the first output data Data3 contained in the reception control circuit 63-4 is outputted as output data Data2 contained in the reception control circuit 63-3 to the shift register 62-3.

Similarly, in the data transmitter circuit 51, the data contained in the internal shift registers 62-1 to 62-4 are shifted with the reception acknowledge signal ACKI being as an internal clock signal. In the data receiver circuit 61, the data contained in the internal shift registers 62-1 to 62-4 are shifted with a reception acknowledge signal ACKO_i being as an internal clock signal.

In addition, as is the case with the first embodiment, the data transmitter circuit 51 counts by the 20-counter 54 the reception acknowledge signals ACKI which are clock signals. When 20 counting terminates, transfer of all data completes. Thus, the transfer completion signal XDONE0 is set to "1". This transfer completion signal XDONE0 is serially transferred in the reception control circuits 63-4 to 63-1 in the data receiver circuit 61, and data transfer terminates at the side of the data receiver circuit 61 as well.

Figure 15:
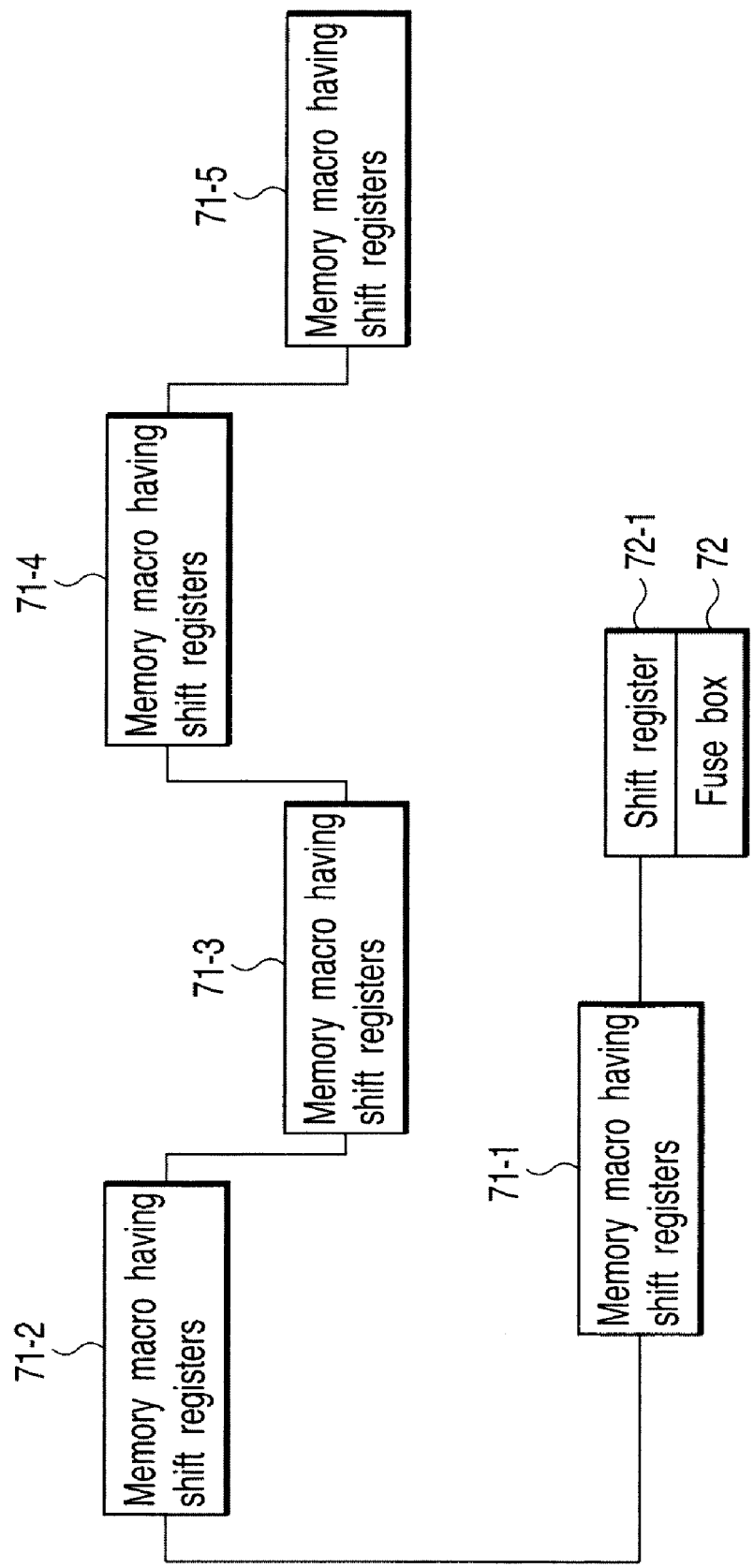
FIG. 15 is a block diagram depicting a configuration in the case where an embodiment of FIG. 13 is applied to a semiconductor memory having a redundancy circuit.

Further, as is the case with an example described in FIG. 11, as shown in FIG. 15 in a semiconductor memory having redundancy and trimming functions with a configuration having a plurality of memory macros, redundancy data and trimming data held in fuse elements can be used when the data is transferred from a fuse box 72 to each of memory macros 71-1 to 71-5. In this case, data contained in the shift register 72-1 in the fuse box 72 may be stored in the shift registers 52-1 to 52-4 of the data transmitter circuit 51 shown in FIG. 13 so that the shift registers 62-1 to 62-4 of the data receiver circuit 61 may be provided as the shift registers of the respective memory macros 71-1 to 71-5.

In addition, as in an example described in FIG. 11, for example, trimming data may be used commonly in all the memory macros; the corresponding fuse elements may be only one set; and data output is switched by a control circuit, whereby data can be transferred.

In the case where the receiving shift registers are thus connected in series as well, data can be reliably transferred to the plurality of shift registers without an occurrence of a transmission error caused by a delay distortion of transmission lines.

The present invention is not limited to the above-described embodiments, and various modifications can occur without deviating from the spirit of the invention when carrying out the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor integrated circuit apparatus comprising:
a data transmitter circuit configured to transmit transfer data to a data reception unit, the data transmitter circuit having shift registers which store the transfer data, and a transmission control circuit having a first data converter circuit which converts each of bits of the transfer data from the shift registers to 2-bit complementary data to output converted data to first and second output terminals, and a transfer managing circuit which outputs a data transfer completion signal to a third output terminal, following transfer of the transfer data to output the signal to the third output terminal, the transfer managing circuit outputting the transfer completion signal in response to a termination of the transfer of the converted data to the data reception unit, and the first data converter circuit being configured to output a clock signal supplied to the shift registers and the transfer managing circuit in response to a reception acknowledge signal and a transfer allowing signal supplied from the data reception unit;
first, second, and third transmission lines connected to the first, second, and third output terminals, respectively;
a plurality of data receiver circuits included in the data reception unit having a plurality of shift registers, input control circuits each connected to an input side of each of the shift registers, the input control circuit having a second data converter circuit which restores 2-bit complementary data transferred from the data transmitter circuit via the first and second transmission lines to the transfer data; and
a data output control circuit connected to an output side of each of the shift registers, the data output control circuits converting each of the bits of the transfer data restored by the second data converter circuit into 2-bit complementary data to output the converted data to a data receiver circuit at a next stage, the plurality of data receiver circuits being connected in series to the data transmitter circuit via the input control circuit and data output control circuit,
wherein each of the data receiver circuits is configured to output a reception acknowledge signal being sent to a data receiver circuit at a former stage when a following stage reception acknowledge signal has been received from a data receiver circuit at a following stage with respect to transfer data transmitted therefrom to the data receiver circuit at the following stage, and wherein a data receiver circuit in a first data receiver circuit connected to receive the converted data from the data converter circuit is configured to output the reception acknowledge signal to the data converter circuit in the data transmitter circuit.

2. A semiconductor integrated circuit apparatus according to claim 1, wherein the shift registers provided in the data transmitter circuit each has an internal data generator circuit which includes a fuse functioning as a programmable nonvolatile memory element.

3. A semiconductor integrated circuit apparatus according to claim 1, wherein the transfer managing circuit has:
a first counter which counts a bit number of an identification number data to output a carrier signal;
a second counter which counts a bit number of the transfer data to output a carrier signal; and
a third counter which outputs a carrier signal when all the transfer data held in the shift registers provided in the data transfer circuit have been transferred.

4. A semiconductor integrated circuit apparatus according to claim 1,
wherein a data receiver circuit directly connected to the data transmitter circuit outputs a reception acknowledge signal to the data transmitter circuit when reception acknowledge signal has been received from a data receiver circuit at a rear stage with respect to transfer data transmitted therefrom, and
the data transmitter circuit controls transfer of the transfer data in response to the inputted reception acknowledge signal.

5. A semiconductor integrated circuit apparatus according to claim 1, wherein each second data converter circuit feeds the restored transfer data to the shift register provided in association with the data receiver circuit by means of an internal clock generated based on the complementary data transmitted from the data transmitter circuit, respectively.

6. A semiconductor integrated circuit apparatus according to claim 3, wherein the first data converter circuit generates an internal clock signal to be supplied in common to the shift registers and the counters provided in the data transmitter circuit based on 2-bit complementary data converted inside thereof.

7. A semiconductor integrated circuit apparatus according to claim 1,
wherein the plurality of data receiver circuits each produces a logical product of first and second transfer enable signals as a secondary transfer acknowledge signal to a circuit at a former stage;
the first transfer enable signal is supplied to each of the plurality of data receiver circuits before starting data transfer; and
a preset fixed second transfer enable signal is supplied to a data receiver circuit at a final stage which receives transfer data first transmitted from the data transmitter circuit of the plurality of data receiver circuits.

8. A semiconductor integrated circuit apparatus according to claim 1, wherein the plurality of data receiver circuits each includes a memory macro, and the data transmitter circuit has: a nonvolatile memory element group which collectively holds control data including a redundancy data required for the plurality of memory macros; and a shift register in which control data stored in the memory element group is stored.

* * * * *